United States Patent
Carr

(10) Patent No.: US 10,801,340 B2
(45) Date of Patent: Oct. 13, 2020

(54) MULTI-PIECE TURBINE AIRFOIL

(71) Applicant: United Technologies Corporation, Hartford, CT (US)

(72) Inventor: Jesse M. Carr, Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1174 days.

(21) Appl. No.: 14/887,847

(22) Filed: Oct. 20, 2015

(65) Prior Publication Data
US 2016/0115801 A1  Apr. 28, 2016

Related U.S. Application Data

(60) Provisional application No. 62/068,097, filed on Oct. 24, 2014.

(51) Int. Cl.
F01D 9/02 (2006.01)
F04D 29/54 (2006.01)
F01D 9/04 (2006.01)
F01D 5/14 (2006.01)
F04D 29/56 (2006.01)
F01D 5/00 (2006.01)
F02C 3/04 (2006.01)
F01D 17/16 (2006.01)

(52) U.S. Cl.
CPC .............. *F01D 9/02* (2013.01); *F01D 5/005* (2013.01); *F01D 5/146* (2013.01); *F01D 5/147* (2013.01);
(Continued)

(58) Field of Classification Search
CPC .......... F01D 5/146; F01D 5/147; F01D 5/187; F01D 5/28; F01D 5/284; F01D 9/02;
(Continued)

(56) References Cited

U.S. PATENT DOCUMENTS 5,785,498 A   7/1998   Quinn et al.
6,206,638 B1  3/2001   Glynn et al.
(Continued)

FOREIGN PATENT DOCUMENTS

EP   1489264   12/2004
EP   2213839   8/2010
(Continued)

OTHER PUBLICATIONS

Extended European Search Report for Application No. 15191214.4 dated Feb. 24, 2016.

Primary Examiner — Todd E Manahan
Assistant Examiner — Kyle Robert Thomas
(74) Attorney, Agent, or Firm — Carlson, Gaskey & Olds, P.C.

(57) ABSTRACT

A gas turbine engine includes a compressor, a combustor fluidly connected to the compressor via a flow path, and a turbine fluidly connected to the combustor via the flow path. At least one multi-piece structure is disposed within the flow path such that the multi-piece structure at least partially radially spans the flow path. The at least one multi-piece structure includes a fore portion defining a leading edge, a consumable aft portion defining a trailing edge, a pressure surface at least partially defined by a first surface of the fore portion and a first surface of the consumable aft portion, and a suction surface at least partially defined by a second surface of the fore portion and a second surface of the consumable aft portion.

18 Claims, 3 Drawing Sheets

(52) U.S. Cl.
CPC ............... *F01D 9/041* (2013.01); *F02C 3/04* (2013.01); *F04D 29/544* (2013.01); *F04D 29/563* (2013.01); *F01D 17/162* (2013.01); *F05D 2240/122* (2013.01); *Y02T 50/672* (2013.01); *Y02T 50/673* (2013.01)

(58) Field of Classification Search
CPC .. F01D 17/162; F04D 29/544; F05D 2230/80; F05D 2240/122; F23R 2900/00019; Y02T 50/672; Y02T 50/773
See application file for complete search history.

(56) References Cited

U.S. PATENT DOCUMENTS

| | | | | |
|---|---|---|---|---|
| 2006/0226290 | A1* | 10/2006 | Campbell | F01D 5/146 244/123.1 |
| 2006/0228211 | A1* | 10/2006 | Vance | F01D 5/14 415/200 |
| 2006/0228221 | A1 | 10/2006 | Heo | |
| 2006/0285973 | A1 | 12/2006 | Keller | |
| 2008/0203236 | A1* | 8/2008 | Mazzola | F01D 5/147 244/35 R |
| 2009/0252612 | A1* | 10/2009 | Ahmad | B23P 15/04 416/241 A |
| 2010/0080687 | A1 | 4/2010 | Vance | |
| 2012/0301313 | A1 | 11/2012 | Suciu et al. | |
| 2014/0227100 | A1 | 8/2014 | Godichon et al. | |
| 2015/0026980 | A1 | 1/2015 | Tellier et al. | |

FOREIGN PATENT DOCUMENTS

| | | |
|---|---|---|
| EP | 2685047 | 1/2014 |
| FR | 2988786 | 10/2013 |
| JP | 6189903 | 5/1986 |
| WO | 2014092909 | 6/2014 |
| WO | 2015091289 | 6/2015 |
| WO | 20150191041 | 12/2015 |

\* cited by examiner

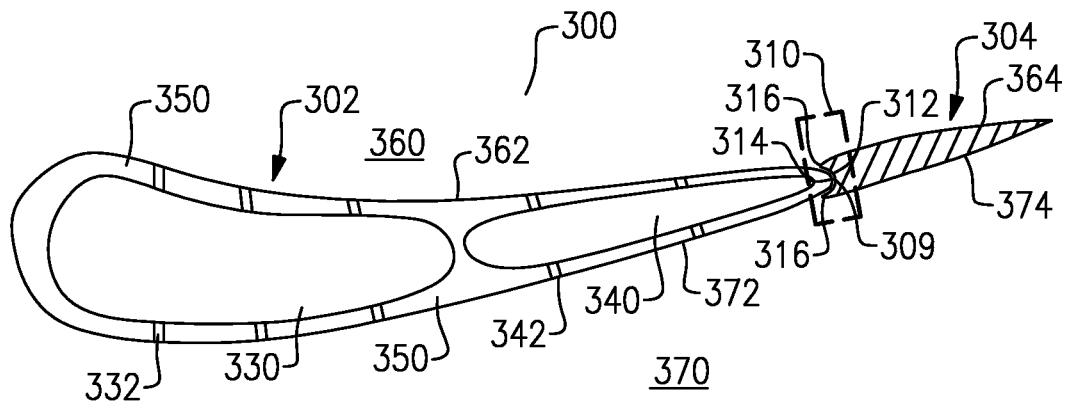
FIG.4
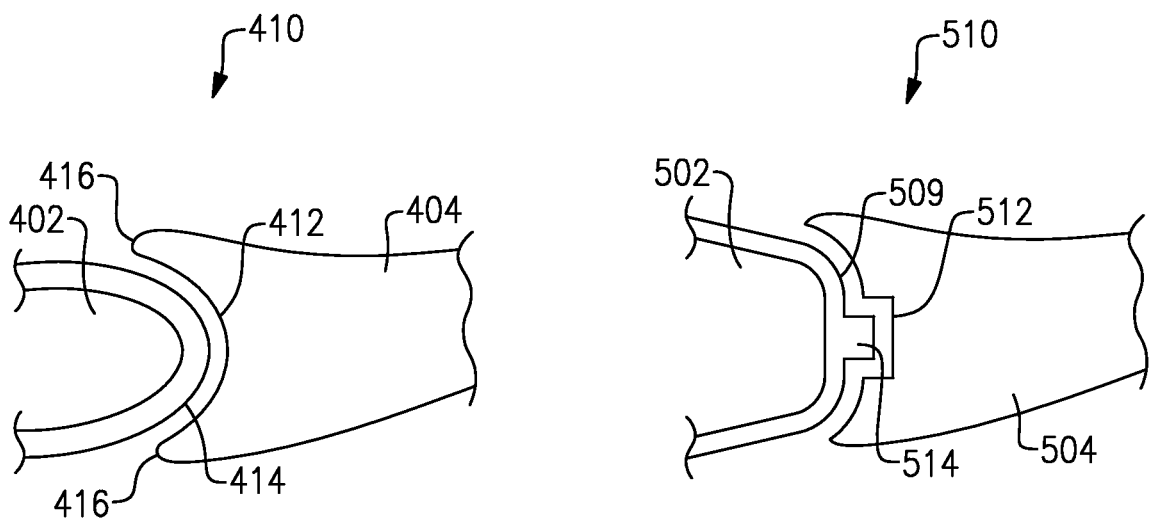
FIG.5A
FIG.5B

MULTI-PIECE TURBINE AIRFOIL

CROSS-REFERENCE TO RELATED APPLICATION

This application claims priority to U.S. Provisional Application No. 62/068,097 filed Oct. 24, 2014.

TECHNICAL FIELD

The present disclosure relates generally to airfoils for gas powered turbines, and more specifically to a multi-piece airfoil.

BACKGROUND

Gas powered turbines, such as those utilized an a gas turbine engine for an aircraft, include a compressor that draws in and compresses air, a combustor where the compressed air is mixed with a fuel and ignited, and a turbine where the resultant combustion gases are expanded. As the resultant combustion gasses expand across the turbine, the turbine is driven to rotate. The turbine is, in turn, connected to the compressor via a shaft, and drives the compressor to rotate.

Each of the compressor, combustor and turbine are interconnected via a core flow path that passes through the gas powered turbine. In order to ensure that gas flowing through the flow path has desirable flow characteristics, multiple flow correcting vanes, or other airfoil shaped turbine components, are included within the flow path. During operation of the gas powered turbine, the gases flowing through the core flow path can heat the flow correcting vane, requiring the turbine airfoil to be cooled.

SUMMARY OF THE INVENTION

In one exemplary embodiment a gas turbine engine includes a compressor, a combustor fluidly connected to the compressor via a flow path, and a turbine fluidly connected to the combustor via the flow path. At least one multi-piece structure is disposed within the flow path such that the multi-piece structure at least partially radially spans the flow path. The at least one multi-piece structure includes a fore portion defining a leading edge, a consumable aft portion defining a trailing edge, a pressure surface at least partially defined by a first surface of the fore portion and a first surface of the consumable aft portion, and a suction surface at least partially defined by a second surface of the fore portion and a second surface of the consumable aft portion.

Another exemplary embodiment of the above described gas turbine engine includes an axial gap defined between the fore portion and the consumable aft portion.

In another exemplary embodiment of any of the above described gas turbine engines, the fore portion has at least one internal cooling cavity.

In another exemplary embodiment of any of the above described gas turbine engines, the consumable aft portion is a solid component.

In another exemplary embodiment of any of the above described gas turbine engines, the fore portion has a first replacement frequency, the consumable aft portion has a second replacement frequency, and the second replacement frequency is more frequent than the first replacement frequency.

In another exemplary embodiment of any of the above described gas turbine engines, a foremost surface of the aft consumable portion and an aftmost surface of the fore portion are complimentary surfaces.

In another exemplary embodiment of any of the above described gas turbine engines, the aftmost surface of the fore portion includes a protrusion, wherein the foremost surface of the consumable aft portion includes a notch, and wherein the protrusion is received in the notch.

In another exemplary embodiment of any of the above described gas turbine engines, the foremost edge of the aft consumable portion defines a concave surface, and wherein the aftmost edge of the fore portion defines a convex surface.

In another exemplary embodiment of any of the above described gas turbine engines, the foremost edge of the aft consumable portion and the aftmost edge of the fore portion are one of generally square, generally concave, and generally convex.

In another exemplary embodiment of any of the above described gas turbine engines, at least one of the fore portion and the consumable aft portion is constructed of a material selected from brittle alloys, monolithic ceramics, and ceramic matrix composites.

In another exemplary embodiment of any of the above described gas turbine engines, the consumable aft portion has a teardrop shaped profile.

In another exemplary embodiment of any of the above described gas turbine engines, the at least one multi-piece structure is a multi-piece flow correcting vane, and wherein the at least one multi-piece structure has an airfoil profile.

An exemplary method for maintaining a multi-piece flow correcting vane, includes performing maintenance on a consumable aft portion of a multi-piece flow correcting vane according to a first maintenance schedule, and performing maintenance on a fore portion of the multi-piece flow correcting vane according to a second maintenance schedule. The first maintenance schedule is more frequent than the second maintenance schedule.

In a further example of the above exemplary method, performing maintenance on a consumable aft portion of a multi-piece flow correcting vane comprises removing the consumable aft portion from the multi-piece flow correcting vane and at least one of repairing and replacing the consumable aft portion.

In one exemplary embodiment a gas turbine engine includes a compressor, a combustor fluidly connected to the compressor via a flow path; a turbine fluidly connected to the combustor via the flow path, and at least one multi-piece structure disposed within the flow path such that the multi-piece structure at least partially radially spans the flow path. The at least one multi-piece structure includes a fore portion defining a leading edge, a consumable aft portion defining a trailing edge, and an axial gap defined between the fore portion and the consumable aft portion.

In another exemplary example of the above described gas turbine engine, the at least one multi-piece structure is a multi-piece flow correcting vane having a pressure surface defined by a first surface of the fore portion and a first surface of the consumable aft portion and a suction surface defined by a second surface of the fore portion and a second surface of the consumable aft portion, and wherein the at least one multi-piece flow correcting vane completely radially spans the flow path.

In another exemplary embodiment of any of the above described gas turbine engines, the fore portion has a first maintenance frequency, the consumable aft portion has a second maintenance frequency, and the second maintenance frequency is more frequent than the first maintenance frequency.

In another exemplary embodiment of any of the above described gas turbine engines, a foremost surface of the aft consumable portion and an aftmost surface of the fore portion are complimentary surfaces.

In another exemplary embodiment of any of the above described gas turbine engines, the aftmost surface of the fore portion includes a protrusion, wherein the foremost surface of the consumable aft portion includes a notch, and wherein the protrusion is received in the notch.

In another exemplary embodiment of any of the above described gas turbine engines, the consumable aft portion has a teardrop shaped profile.

These and other features of the present invention can be best understood from the following specification and drawings, the following of which is a brief description.

BRIEF DESCRIPTION OF THE DRAWINGS

FIG. 4 schematically illustrates a cross sectional view of an alternate multi-piece flow correcting vane cut along view line 150.

FIG. 5A schematically illustrates a first example joint between a consumable aft portion and a fore portion of a multi-piece flow correcting vane.

FIG. 5B schematically illustrates a second example joint between a consumable aft portion and a fore portion of a multi-piece flow correcting vane.

DETAILED DESCRIPTION OF AN EMBODIMENT

Figure 1:
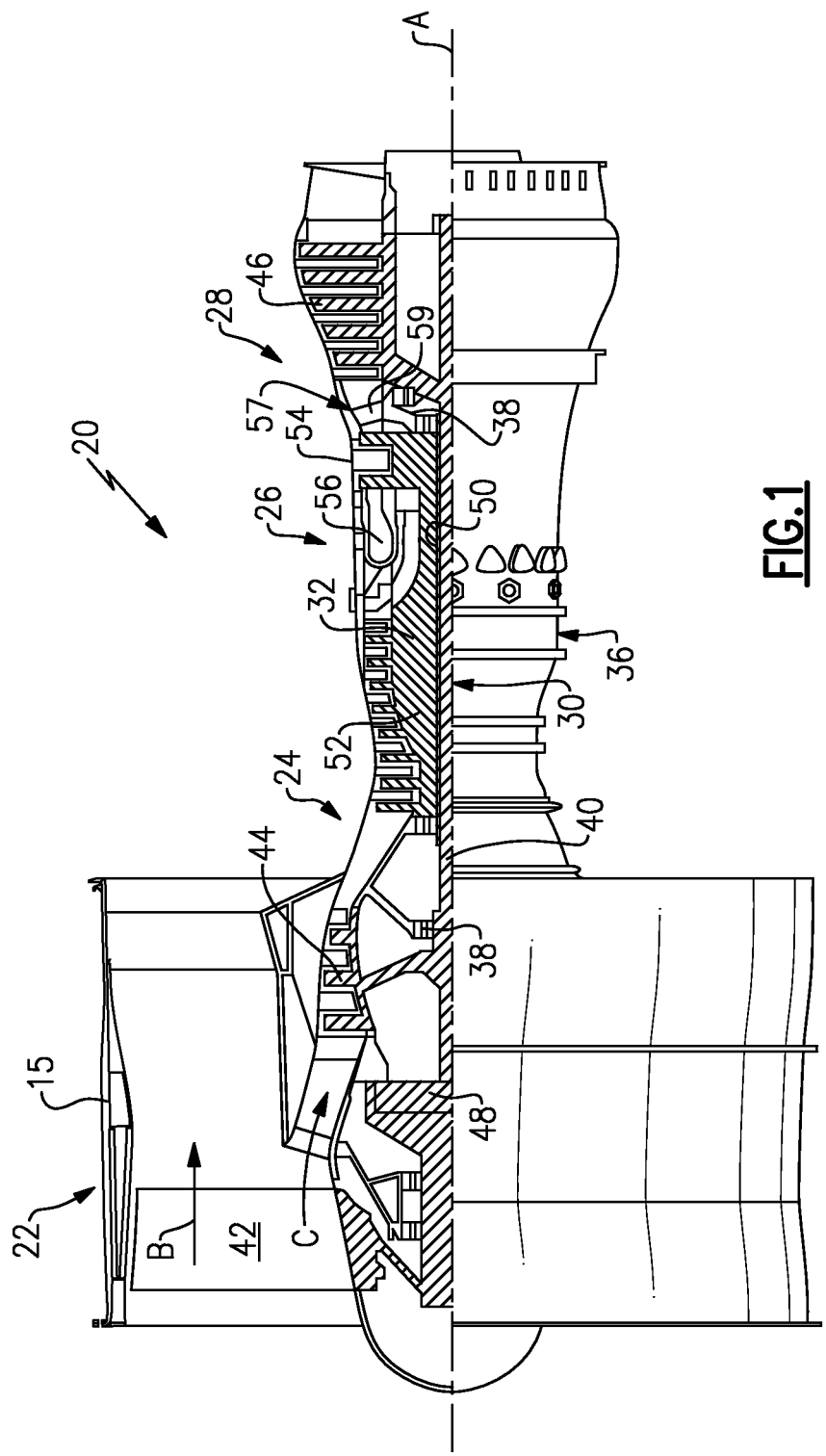
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{\wedge}0.5$. The "Low corrected fan tip speed" as disclosed herein according to one non-limiting embodiment is less than about 1150 ft/second.

In order to ensure proper fluid flow through the primary flow path, multiple flow correcting vanes are utilized in the flow path. The flow correcting vanes span the flow path and have an airfoil shaped profile. The airfoil shaped profile is designed to impart desirable flow characteristics on the fluid flowing through the primary flow path. In practice, the exposure of the vanes to the high temperature fluid flowing through the flow path requires either active or passive cooling in the flow correcting vane in order to extend the lifecycle of the vane. As a typical vane is a single monolithic component, the expected lifecycle of the vane is limited by the lifecycle of the least effectively cooled area of the vane. The least effectively cooled area of the vane is most frequently the trailing edge, as there is insufficient room in the trailing edge for an internal cooling cavity. This lack of internal cavity space for convective cooling motivates the use of film cooling at the trailing edge in existing systems. Film cooling, in turn, comes with a performance penalty and which may be structurally intolerable for brittle materials. As a result of the insufficient cooling, oxidation, corrosion, and fatigue damage can occur within the trailing edge, thereby reducing the lifespan of the flow correcting vane.

In some previous examples, the damage to this region is limited by using a larger trailing edge radius for the airfoil (i.e. a fatter trailing edge rather than a thin trailing edge). Utilization of this approach comes with an aerodynamic performance penalty which may be offset partially by the cycle benefit of removing trailing edge cooling.

Figure 2:
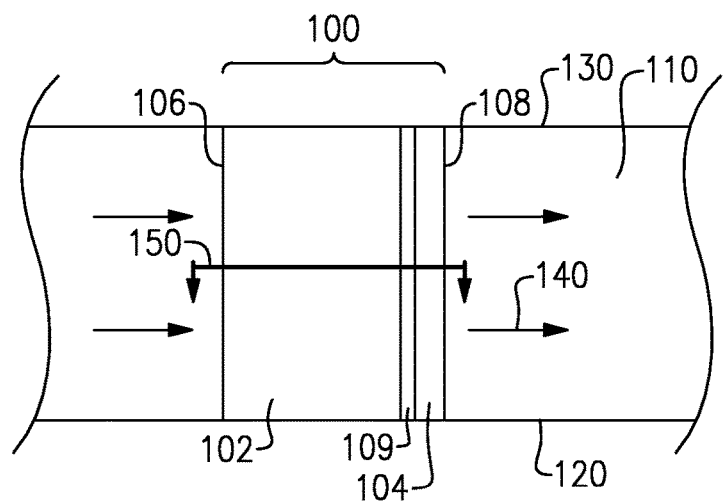
FIG. 2 schematically illustrates a side view of a multi-piece flow correcting vane for a gas turbine engine.

FIG. 2 schematically illustrates a multi-piece flow correcting vane 100 included within a primary flow path 110 of a gas turbine engine 20 (illustrated in FIG. 1). The multi-piece flow correcting vane 100 spans an inner diameter 120 and an outer diameter 130 of the flow path 110 and has an airfoil shaped profile along view line 150. The multi-piece flow correcting vane 100 includes a fore portion 102 and a consumable aft portion 104. The consumable aft portion 104 is decoupled from the fore portion 102, and has a shorter lifecycle than the fore portion 104.

A leading edge 106 of the multi-piece flow correcting vane 100 is a foremost edge of the fore component 102, while a trailing edge 108 of the multi-piece flow correcting vane 100 is an aftmost edge of the consumable aft portion 104. The fore portion 102 is a cooled component including multiple internal cooling cavities (illustrated in FIGS. 3 and 4). In some examples the fore portion 102 is actively cooled using a known film cooling process. In alternative examples, the fore portion 102 is convectively cooled using only the internal cavities and a cooling fluid.

The consumable aft portion 104 is a distinct piece from the fore portion 102, and is distanced from the fore portion 102 by a gap 109. The consumable aft portion 104 is constructed of a solid material, and is not directly cooled actively. In some examples, the consumable aft portion 104 is constructed of a different material, having different thermal and structural qualities, than the material of the fore portion 102. In alternative examples, the consumable aft portion 104 is constructed of the same materials and construction as the fore portion 102 but lacks internal cooling cavities.

In some examples, the material used to construct at least one of the fore portion 102 and the consumable aft portion 104 include brittle alloys (e.g. a molybdenum alloy), monolithic ceramics, and ceramic matrix composites. Each of these materials is a relatively high temperature material, rendering them suitable for forming an airfoil portion which does not require film cooling.

During practical operation of the turbine engine 20, heat from a fluid 140 flowing through the flow path 110 heats up the multi-piece flow correcting vane 100. The active or passive cooling within the fore portion 102 of the multi-piece vane 100 extends the lifecycle of the fore portion 102. The consumable aft portion 104, however is not cooled and is "consumed" (deteriorates at a faster rate than the fore portion 102.) In order to compensate for this, the consumable aft portion 104 has a more frequent maintenance schedule. In some examples, the maintenance schedule of the consumable aft portion 104 is scheduled to ensure that both the fore portion 102 and the consumable aft portion are replaced in the same maintenance, with the consumable aft portion 104 having additional scheduled maintenance in between the shared scheduled maintenance. By ensuring that the maintenance scheduling of the fore portion 104 coincides with a maintenance scheduling of the consumable aft portion 104, the number of maintenances is minimized. Further, the maintenance schedule can incorporate scheduled maintenance and scheduled replacements of the consumable aft portion 104, and is not limited to just repairing or just replacing the components scheduled for maintenance.

Figure 3:
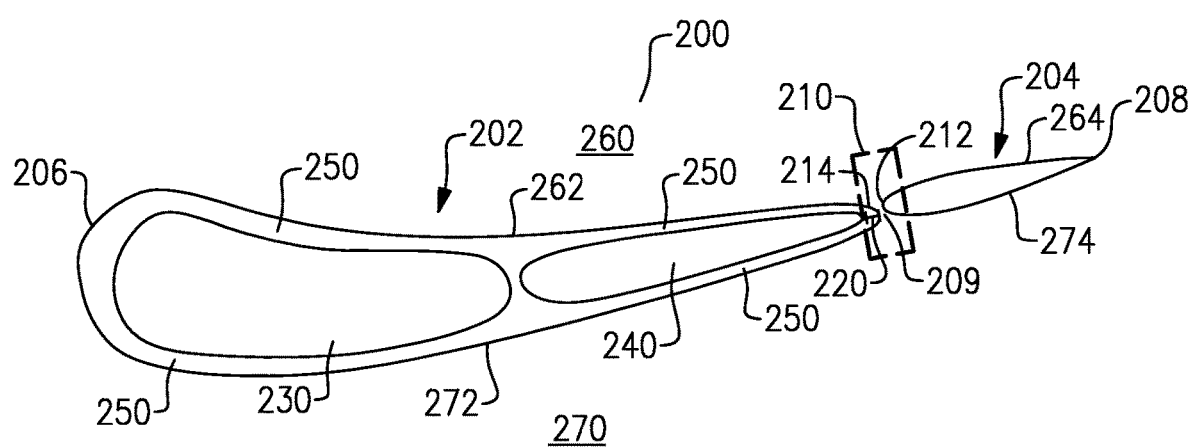
FIG. 3 schematically illustrates a cross sectional view of one example multi-piece flow correcting vane cut along view line 150.

With continued reference to FIG. 2, FIG. 3 schematically illustrates a cross section of one example multi-piece flow correcting vane 200 cut along view line 150. The multi-piece flow correcting vane 200 includes a cooled fore portion 202 and an uncooled consumable aft portion 204, with a gap 209 disposed between the portions 202, 204. The gap 209 is defined along the direction of fluid flow through the flow path in which the multi-piece flow correcting vane 200 is disposed. A leading edge 206 of the multi-piece flow correcting vane 200 is at a foremost edge of the fore portion 202, and a trailing edge 208 of the multi-piece flow correcting vane 200 is at an aft most edge of the consumable aft portion 204. A pressure surface 260 of the multi-piece flow correcting vane 200 is defined by a first surface 262 of the fore portion and a first surface 264 of the consumable aft portion 202. Similarly, a suction surface 270 of the multi-piece flow correcting vane 200 is defined by a second surface 272 of the fore portion and a second surface 274 of the consumable aft portion 204.

Contained within the fore portion 202 are multiple cooling cavities 230, 240. The illustrated example of FIG. 3 passively cools walls 250 by passing a cooling fluid through the cooling cavities 230, 240 of the fore portion 204. The magnitude by which the walls 250 are cooled is dependent upon the thickness of the walls 250, with a thicker wall 250 resulting in decreased effective cooling at that wall 250. In the illustrated example of FIG. 3, a thickness 220 of the wall 250 at the aftmost edge of the fore portion 202 is similar to the thickness of the remainder of the walls 250. In contrast, in a single piece flow correcting vane, the thickness 220 at the aftmost edge would extend the full length of the trailing edge region (corresponding to the consumable aft portion 204). This extensive thickness at the trailing edge results in significantly decreased cooling effectiveness.

The region of the multi-piece flow correcting vane 200 where the fore portion 202 and the consumable aft portion 204 abut is referred to as a joint region 210. In the illustrated example, the fore edge 212 of the consumable aft portion 204 and the aft edge 214 of the fore portion 202 are rounded in opposite directions with the gap 209 defined between the rounded edges 212, 214.

In some examples, the leading edge of the consumable aft portion 204 and the trailing edge of the fore portion 202 can each be one of three general geometries generally square, generally concave, and generally convex. In each of the examples, the gap 209 is maintained between the fore portion 202 and the consumable aft portion 204.

With regard to attachment, we can mention that the aft piece could be supported as a cantilever from the outer or inner endwall, simply supported between both, or supported partially or in full by direct attachment to the airfoil itself.

Alternative example joint regions 210 are illustrated in FIGS. 4, 5A and 5B. One of skill in the art, having the benefit of this disclosure, will understand that the features of the alternative joint regions can be applied in place of, or in combination with, the features of the illustrated joint region 210.

With continued reference to FIGS. 2 and 3, FIG. 4 schematically illustrates a cross section of one example multi-piece flow correcting vane 300 cut along view line 150. As with the example of FIG. 3, the multi-piece flow correcting vane 300 includes a cooled fore portion 302 and an uncooled consumable aft portion 304, with a gap 309 disposed between the portions 302, 304. The gap 309 is defined along the direction of fluid flow through the flow path in which the multi-piece flow correcting vane 300 is disposed. A leading edge 306 of the multi-piece flow correcting vane 300 is at a foremost edge of the fore portion 302, and a trailing edge 308 of the multi-piece flow correcting vane 300 is at an aft most edge of the consumable aft portion 304. A pressure surface 360 of the multi-piece flow correcting vane 300 is defined by a first surface 362 of the fore portion and a first surface 364 of the consumable aft portion 302. Similarly, a suction surface 370 of the multi-piece flow correcting vane 300 is defined by a second surface 372 of the fore portion and a second surface 374 of the consumable aft portion 304.

Contained within the fore portion 302 are multiple cooling cavities 330, 340. The walls 350 of the fore portion 302 include multiple film cooling holes 332, 342 providing a fluid outlet to cooling fluid passing through the cooling fluid cavities 330, 340. The cooling fluid exits the cooling cavities 330, 340 through the film cooling holes 332, 342 and creates a film cooling layer that actively cools the exterior of the fore portion 302 according to known film cooling techniques.

As with the passive cooling of FIG. 3, the magnitude by which the walls 350 are cooled is dependent upon the thickness of the walls 350, with a thicker wall 350 resulting in decreased effective cooling at that wall 350. Further, in the illustrated example of FIG. 4, a thickness of the wall 350 at the aft most edge of the fore portion 302 is similar to the thickness of the remainder of the walls 350.

A joint region 310 of the multi-piece flow correcting vane 300 includes a concave surface 312 of the consumable aft portion 304 and a convex surface 314 of the fore portion 302. The physical structure of the concave surface 312 and the convex surface 314 are such that the surfaces are complimentary to each other and form a nested arrangement. The foremost tips 316 of the consumable aft portion 304 are generally pointed, allowing for a more seamless joint section than a rounded alternative.

With collective reference to the examples of FIGS. 3 and 4, the cooled fore portion 202, 302 can, in alternative examples, be cooled using any other vane/rotor cooling system aside from passive cooling or film cooling. In the alternative examples, the consumable aft portion 204, 304 remains uncooled. In some alternative examples, residual cooling effects may entrain onto the consumable aft portion 204, 304 and provide minimal cooling to the consumable aft portion 204, 304. In such examples, the consumable aft portion 204, 304 is referred to as uncooled, as the residual cooling effect is unintended.

With further collective reference to FIGS. 3 and 4, the consumable aft portion 204, 304 in both examples is a general teardrop shape with a wide end immediately adjacent the fore portion 302. The consumable aft portion 304 tapers into a skinny end downstream of the wide end to form the general teardrop shape. Alternative profiles, including airfoil profiles, rectangular profiles, oval profiles, and the like, can be used for the consumable aft portion 204, 304 in place of the illustrated teardrop profile, depending on the needs of a specific multi-piece flow correcting vane 200, 300.

With continued reference to FIGS. 2-4, FIGS. 5A and 5B illustrate alternative example joint regions 410, 510. In the illustrated example of FIG. 5A, the joint region 410 includes a concave surface on the consumable aft portion 404 and a convex surface 414 on the fore portion 402. Unlike the joint region 310 illustrated in FIG. 4, each of the aftmost ends 416 are rounded. The specific radius of the rounded edges, and shape of the rounding can be designed by one of skill in the art to achieve specific flow properties at the edges 416.

FIG. 5B illustrates an alternative complimentary surface shape including a post 514 extending from the fore portion 502 into a notch 512 in the consumable aft portion 504. The post 514 and notch 512 configuration can provide better alignment between the fore portion and the consumable aft portion 504, and can reduce a cross flow of fluid through the gap 509.

One of skill in the art, having the benefit of this disclosure, will further understand that the illustrated joint region configurations 210, 310, 410, 510 can be combined in whole or in part to achieve desired flow effects across a multi-piece flow correcting vane.

In yet a further example, the gap 209, 309, 409, 509 can be eliminated entirely by installing the consumable aft portion 204, 304, 404, 504 such that the consumable aft portion 204, 304, 404, 504 abuts the fore portion 202, 302, 402, 502.

While illustrated and described above with regards to a gas powered turbine, such as a geared turbofan engine, one of skill in the art having the benefit of this disclosure will understand that the illustrated and described concepts can be applied to alternative turbine designs including, but not limited to, land based turbines, marine based turbines, and direct drive turbofan engines.

Furthermore, while illustrated and described above as a flow correcting vane fully spanning a fluid flow path, ne of skill in the art, having the benefit of this disclosure will understand that multi-piece airfoil component can be applied to a rotating blade disposed within a flow path, or a partial vane disposed within a flow path with minimal structural modifications. The modified examples achieve all the benefits described above, and fall within the instant disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor;
   a combustor fluidly connected to the compressor via a flow path;
   a turbine fluidly connected to the combustor via the flow path;
   at least one multi-piece structure disposed within said flow path such that the multi-piece structure at least partially radially spans the flow path, and wherein the at least one multi-piece structure includes:
      a fore portion defining a leading edge and having a first replacement frequency;
      a consumable aft portion defining a trailing edge and having a second replacement frequency, wherein the consumable aft portion is a solid component defined by a lack of voids within the consumable aft portion;
      a pressure surface at least partially defined by a first surface of said fore portion and a first surface of said consumable aft portion;
      a suction surface at least partially defined by a second surface of said fore portion and a second surface of said consumable aft portion; and
   wherein the second replacement frequency is more frequent than the first replacement frequency.

2. The gas turbine engine of claim 1, further comprising an axial gap defined between said fore portion and said consumable aft portion.

3. The gas turbine engine of claim 1, wherein the fore portion has at least one internal cooling cavity.

4. The gas turbine engine of claim 1, wherein a foremost surface of the aft consumable portion and an aftmost surface of the fore portion are complementary surfaces.

5. The gas turbine engine of claim 4, wherein the aftmost surface of the fore portion includes a protrusion, wherein the foremost surface of the consumable aft portion includes a notch, and wherein the protrusion is received in the notch.

6. The gas turbine engine of claim 1, wherein a foremost edge of the aft consumable portion defines a concave surface, and wherein an aftmost edge of the fore portion defines a convex surface.

7. The gas turbine engine of claim 1, wherein a foremost edge of the aft consumable portion and an aftmost edge of the fore portion are one of square, concave, and convex.

8. The gas turbine engine of claim 1, wherein at least one of the fore portion and the consumable aft portion is constructed of a material selected from brittle alloys, monolithic ceramics, and ceramic matrix composites.

9. The gas turbine engine of claim 1, wherein the consumable aft portion has a teardrop shaped profile.

10. The gas turbine engine of claim 1, wherein the at least one multi-piece structure is a multi-piece flow correcting vane, and wherein the at least one multi-piece structure has an airfoil profile.

11. The gas turbine engine of claim 1, wherein the fore portion and the consumable aft portion are constructed of distinct materials.

12. The gas turbine engine of claim 1, wherein the consumable aft portion is characterized by a lack of direct cooling.

13. The gas turbine engine of claim 1, wherein a foremost edge of the aft consumable portion defines a concave surface including a notch extending into the concave surface, and wherein an aftmost edge of the fore portion defines a convex surface including a tab extending from the convex surface, the tab being at least partially received in the notch.

14. A gas turbine engine comprising:
   a compressor;
   a combustor fluidly connected to the compressor via a flow path;
   a turbine fluidly connected to the combustor via the flow path;
   at least one multi-piece structure disposed within said flow path such that the multi-piece structure at least partially radially spans the flow path, and wherein the at least one multi-piece structure includes:
      a fore portion defining a leading edge and having a first maintenance frequency;
      a consumable aft portion, wherein the consumable aft portion is a solid component defined by a lack of voids within the consumable aft portion, the consumable aft portion defining a trailing edge and having a second maintenance frequency, wherein the second maintenance frequency is more than the first maintenance frequency; and
      an axial gap defined between said fore portion and said consumable aft portion.

15. The gas turbine engine of claim 14, wherein said at least one multi-piece structure is a multi-piece flow correcting vane having a pressure surface defined by a first surface of said fore portion and a first surface of said consumable aft portion and a suction surface defined by a second surface of said fore portion and a second surface of said consumable aft portion, and wherein said at least one multi-piece flow correcting vane completely radially spans the flow path.

16. The gas turbine engine of claim 14, wherein a foremost surface of the aft consumable portion and an aftmost surface of the fore portion are complementary surfaces.

17. The gas turbine engine of claim 16, wherein the aftmost surface of the fore portion includes a protrusion, wherein the foremost surface of the consumable aft portion includes a notch, and wherein the protrusion is received in the notch.

18. The gas turbine engine of claim 14, wherein the consumable aft portion has a teardrop shaped profile.

* * * * *